(12) United States Patent
Vincent et al.

(10) Patent No.: US 6,329,437 B1
(45) Date of Patent: Dec. 11, 2001

(54) MATERIALS FOR CONSTRUCTION ENGINEERING BASED ON RECYCLED OR NEWLY MADE PLASTIC MATERIALS, IMPROVED BUILDING COMPONENTS MADE FOR SAID MATERIALS AND METHODS OF MAKING SAME

(76) Inventors: Irvin G. Vincent, 112 Fourth St., Luxemburg, WI (US) 54217-0480; Ralf D. Weber, 425 S. Adams St., Green Bay, WI (US) 54301

( * ) Notice: Subject to any disclaimer, the term of this patent is extended or adjusted under 35 U.S.C. 154(b) by 0 days.

(21) Appl. No.: 09/300,868

(22) Filed: Apr. 28, 1999

(51) Int. Cl.[7] ........................................ C08J 11/04
(52) U.S. Cl. .................. 521/40.5; 521/45.5; 521/134; 428/489
(58) Field of Search .................. 521/45.5, 40.5, 521/134; 428/489

(56) References Cited

U.S. PATENT DOCUMENTS 5,030,662 * 7/1991 Banerjie .......................... 521/43.5
5,416,139 * 5/1995 Zeiszler ............................ 524/13

\* cited by examiner

*Primary Examiner*—Duc Truong
(74) *Attorney, Agent, or Firm*—Michael J. Striker

(57) ABSTRACT

The universal building material for construction engineering is made from plastic waste material from any and all types of plastics and/or from newly made or fresh plastic materials and is used to make various improved building components, building elements or buildings. The material is environmentally friendly and does not cause any health problems. The material can be combined with other building materials and raw materials. It is also not easily inflammable and has very good heat transfer and thermal insulation properties. In addition, it is waterproof, weatherproof, and it can easily be worked with. The material also has the property that the waste that it produces is always reusable. It has also comparatively small financial and economical expenses during the production and fabrication. The material conserves natural resources and complies with legal requirements in the building industry. The universal building material can contain recycled material from any type of plastic waster materials or fresh or newly made plastic materials, such as PE, PVC, PP, PS and ABS, and can be used for building construction above and below ground, as an additive material in other building materials, as a balance material and for thermal insulation and for sound absorption. The volume and weight ratios or proportions of the different types of plastic materials provided in the recycled material and/or the newly produced plastic materials can be adjusted to fit each particular application.

5 Claims, 3 Drawing Sheets

MATERIALS FOR CONSTRUCTION ENGINEERING BASED ON RECYCLED OR NEWLY MADE PLASTIC MATERIALS, IMPROVED BUILDING COMPONENTS MADE FOR SAID MATERIALS AND METHODS OF MAKING SAME

BACKGROUND OF THE INVENTION

1. Field of the Invention

The present invention relates to improved building materials made from recycled plastic waste materials and/or freshly or newly produced plastic materials for the construction or building industry, and also to building components or elements made using the improved building materials and also to methods of making a building material from recycled plastic waste materials and/or freshly or newly produced plastic materials for a particular application with special properties.

2. Prior Art

Especially since building materials are now increasingly required to be environmentally friendly, building materials that comply with different legal requirements must be used in the building industry. These materials may include newly or freshly produced plastic materials, as well as of recycled plastic materials, which are made from plastic waste. It is also important that the waste that is produced during construction is environmentally friendly and can be reused. In addition, demolition material that comes into existence from the above-mentioned building materials should be both environmentally friendly and reusable for redevelopment.

Currently, only partial solutions or individual building materials could be developed that satisfy these requirements. The currently used building materials, which are used, for example, as balance material, insulation material and sound absorbing material, as well as for the production of building elements and buildings, are expensive in their production and treatment and only a small percentage of these materials are reusable.

There are several other disadvantages of current building materials, such as balance materials, barrier materials and insulation materials, used for construction of building elements and buildings. They often consist of a mineral or chemical raw material, that requires considerable engineering effort to prepare, break down or dispose of, and that is expensive to make. In addition, these building materials burden the environment when the building is renovated or demolished. Also of importance is the fact that the demolition material causes additional expenses during the waste disposal or recycling.

There are even more disadvantages. Current building materials are not always pourable, are often not in accordance with the required fire codes and are not always waterproof or weatherproof. In addition, they are often provided with unhealthy binders and they have to be adjusted to fit the required geometrical dimensions.

According to the state of the art building materials made of plastic material are freshly or newly produced from raw materials for each individual application. For example, German patent, DE 42 02 431 C2 describes a method and apparatus for making a lightweight aggregate material with a comparatively hard surface for plaster, concrete, mineral or plastic bonded insulating panels as well as insulating material for filling, in which expanded polystyrene is comminuted, fractionated and heated or treated thermally. This process is expensive, the material is combustible and not universally usable and plastic waste from it cannot be used for construction.

In addition, the Swiss patent CH 622,049 describes a granulated material for use as a filler for drainage packing, which consists of a core of a higher specific gravity than its outer surface layer or jacket. The production and engineering costs for this granulated material are high. It is not possible to use it in all for construction engineering applications above and under the earth. Besides, it is not possible to produce it out of waste plastics and it is difficult to recycle.

In the German patent DE-G 94 00 024.7 building materials, such as concrete, mortar, flooring plaster and fillers, are described in which a granulate made of plastic material is used as an added aggregate. This granulate can be made from waste plastics by milling and then again extruding. This method requires a lot of energy and is also very expensive. This granulate can only be used in concrete and mortar, and the fabrication of building components or buildings from this material is not possible.

SUMMARY OF THE INVENTION

It is an object of the present invention to provide a universal building material for construction engineering made from recycled plastic waste material and/or freshly or newly made plastic material containing any plastic compounds, which has thermal insulation properties and sound absorption properties and is environmentally friendly and does not cause any health problems.

It is also an object of the present invention to provide a universal building material for construction engineering made from recycled plastic waste material and/or freshly or newly made plastic material containing any plastic compounds, which may be mixed and combine with other standard building materials, such as cement and plaster, and raw materials.

It is a further object of the present invention to provide a universal building material for construction engineering made from recycled plastic waste material and/or freshly or newly made plastic material containing any plastic compounds, which is not easily inflammable, has a very good heat transfer and insulation properties, is waterproof and weatherproof, and it is very easy to work with it.

It is an additional object of the present invention to provide a universal building material for construction engineering made from recycled plastic waste material and/or freshly or newly made plastic material containing any plastic compounds, which produces a waste material when worked or used which can always be reused, and is financially and economically low in cost, conserves resources and complies with the legal requirements for a building material.

It is another object of the present invention to provide a method of making a building material for a particular application from plastic waste materials and/or newly made plastic materials by adjusting the amounts and volume percentages of the various plastic materials to obtain a building material with special or improved properties.

It is another object of the present invention to provide building components or elements, such as floor sections, roadway sections and bridge components, used in the construction industry from a building material containing recycled plastic waste materials and/or newly made or fresh plastic materials that provide sound absorption, thermal insulation, water resistance, weather resistance and/or fire retardant properties.

According to the invention freshly or newly produced plastic materials and/or recycled plastic waste material containing any plastic compounds, for example PE (polyethylene), PVC (polyvinyl chloride), PP (polypropylene), PS(polystyrene), ABS(acrylonitrile butadiene styrene), are prepared in the usual way, preferably shredded, and are mixed in suitable amounts to form a universal building material for the building sector or construction engineering. This building material is used to produce new building elements or compounds and buildings having improved properties.

For particular applications that require a special building material with particular properties the volume proportions and amounts of the different recycled plastic waste materials and newly produced plastic materials are determined and adjusted according to the particular properties that are desired. It is important to note that the mixture ratios of the individual plastic materials, as well as of the recycled materials depend on the special properties desired, such as thermal insulation and sound absorption properties.

The building materials that are made from recycled plastic waste materials and/or newly made plastic materials can be mixed and combined universally with other building materials used as filling material to form a useful composite material.

The recycled plastic waste materials and/or newly made plastic materials can be processed in a special way for above ground construction to make a special fire resistant building material and building components.

Newly produced plastic material can be mixed as a building material with recycled plastic waste material to obtain special physical characteristics. The same can be done by mixing recycled plastic waste material with newly made plastic materials.

The universal building material according to the invention can be used as a balance material for the sectors of the construction industry that require balance materials. The newly produced plastic materials and the recycled plastic waste materials may be used in the same or different amounts. The balance material may also be made so that it is waterproof, weatherproof, not flammable, and/or having different compression strengths.

The universal building material according to the invention can also be used as a universal insulating material in the entire construction industry for the heat insulation and cold insulation.

The universal building material can also be used as a universal sound absorbing material for the entire building industry sector in which sound absorbing materials are needed.

In addition, the newly produced plastic materials and recycled plastic waste materials can be used for production of building elements and building components. These materials can even be used under high static stress. For reinforcement, fibers or alternate reinforcing means can be used. Besides, these materials can have a decorative surface.

By suitable processing, building components, as well as whole buildings can be built out of newly produced plastic materials and also recycled material made of waste plastics.

The building material, i.e. the newly produced plastic materials and waste plastic materials, can also be a founding or pourable substance, which has a composition according to the particular application or use.

The invention has certain special advantages. The fundamental building materials according to the invention including balance material, insulation material and sound absorbing material can be made from newly or freshly produced plastic materials and from recycled materials made from plastic waste which is always available and inexpensive. Dump land area can be reduced by using plastic waste. Geologically formed naturally occurring mineral materials that are mined in large amounts can thus be conserved by using these basic building materials.

In addition, the characteristics of the building materials that are produced from newly produced plastic materials and recycled materials made of waste plastics are improved in comparison to normal building materials because they can be ecologically compatible and harmless for health. The building material according to the invention is not easily inflammable and has good heat transfer and insulation properties and a high compressive strength. The building material according to the invention has an adjustable or variable density in contrast to conventional mineral building materials. It is also waterproof, weatherproof and easy to work with. The building material can be used in all building sectors while it is easy to work with.

It can be combined with other building materials in different fractions. It is possible to produce building components with high static stress or load requirements by mixing reinforcing fibers or other reinforcement in the building material of the invention. Decorative surfaces can be achieved by molding devices or by coating building components or building elements. The production expenses for the building materials of the invention are very small. The production of the final product occurs using standard engineering methods and apparatuses.

Annually incurring waste is mostly brought to dump/land fills or is thermally used. By doing so, a changed, naturally increasing important raw material is lost. By reusing it, the plastic waste materials become raw materials that can always be reused again because of their specific different characteristics, due to today's and tomorrow's technology. In addition, natural resources are saved. The positive ecological and economical effect, which will be achieved by recycling of waste plastic materials can be appreciated because of the large amount of plastic materials currently in use today.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
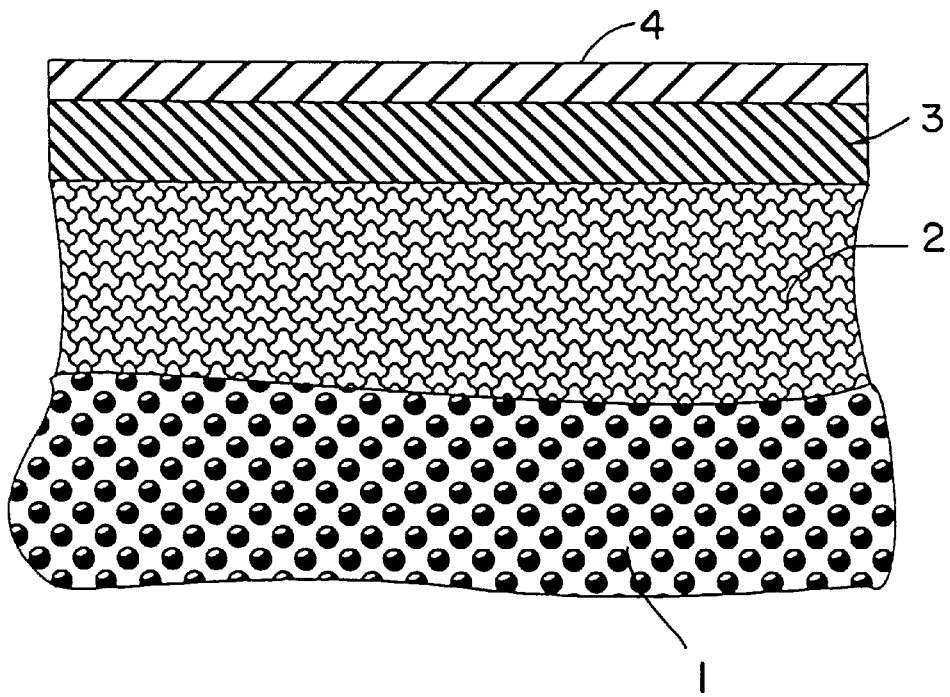
FIG. 1 is a cross-sectional view through a street showing a layer made of recycled plastic waste materials and/or newly produced plastic materials for insulation and sound absorption under a concrete or other street covering layer.

According to Fig. 1, the structure of a street consists of a substructure 1, for example, gravel; of an insulating layer 2, of primary produced plastic materials or recycled plastic waste materials acting as a barrier and insulation layer; a supporting layer 3, especially made of concrete or asphalt and a covering layer 4 made of asphalt or other materials that are used in street construction. The insulating layer 2 is applied and packed with pourable recycled material made of plastic waste materials in a normal way. The supporting layer 3 can thus be applied up with standard materials and conventional engineering methods. No further packing of the insulating layer 2 will occur so that the elasticity remains the same and there is no worsening of the sound absorption and insulation properties and drainage qualities as time progresses.

Figure 2:
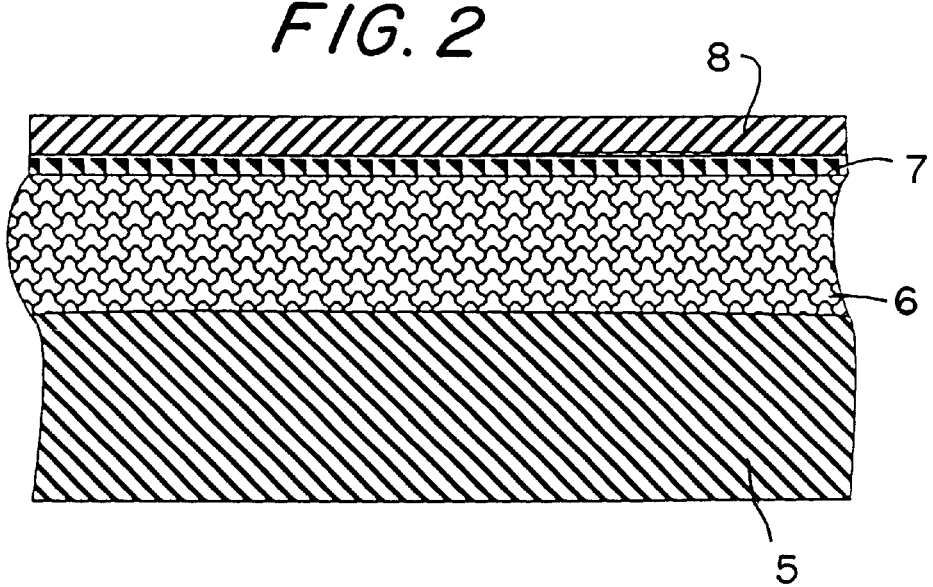
FIG. 2 is a cross-sectional view through a floor showing a layer made of plastic waste materials and/or newly produced plastic materials for insulation and sound absorption and as a balance material in floor construction under concrete or some other covering layer.

According to FIG. 2, a cross-section through a floor, a balance layer 6 made of newly produced plastic materials or made of recycled materials made of waste plastic is applied to a large sub-floor 5. The balance material can also be used to provide a heat insulating and sound absorbing layer. The further floor construction is done in the standard way to provide a covering layer 7 and a top terminal layer 8, for example, flooring plaster. The balance layer 6 made of not easily inflammable newly produced plastic materials or recycled material made of waste plastic materials, is simply applied by filling, smoothed or leveled out and then provided with the covering layer 7. Because of the characteristics of the plastic materials, the insulating and sound absorbing characteristics of the balance layer 6 remain constant. In comparison to mineral floor components the plastic materials have a reduced density, and because of that a reduced weight.

Figure 3:
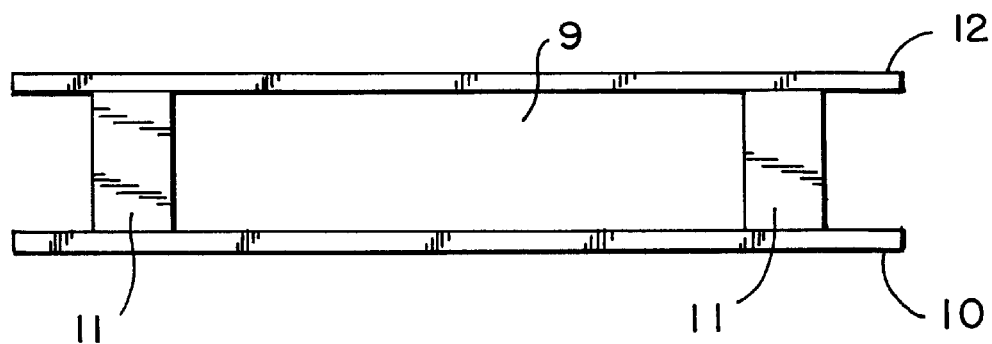
FIG. 3 is a cross-sectional view through a wood floor showing a layer made of recycled plastic waste materials and/or newly produced plastic materials for sound absorption and heat insulation in wood structures, such as houses and other buildings.

According to FIG. 3, not easily inflammable primary produced plastic materials or recycled materials made of waste plastic are used for the sound absorbing and heat insulation in a wood floor. This material is filled in cavities 9, which are formed between a lower subflooring flooring 10, floor beams 11 and an upper sub-flooring 12. The good characteristics for the sound absorbing and heat insulation remain the same during the entire lifetime of the floor because of the properties of the specific materials. Another advantage is the pest avoidance properties of this building material.

Figure 4:
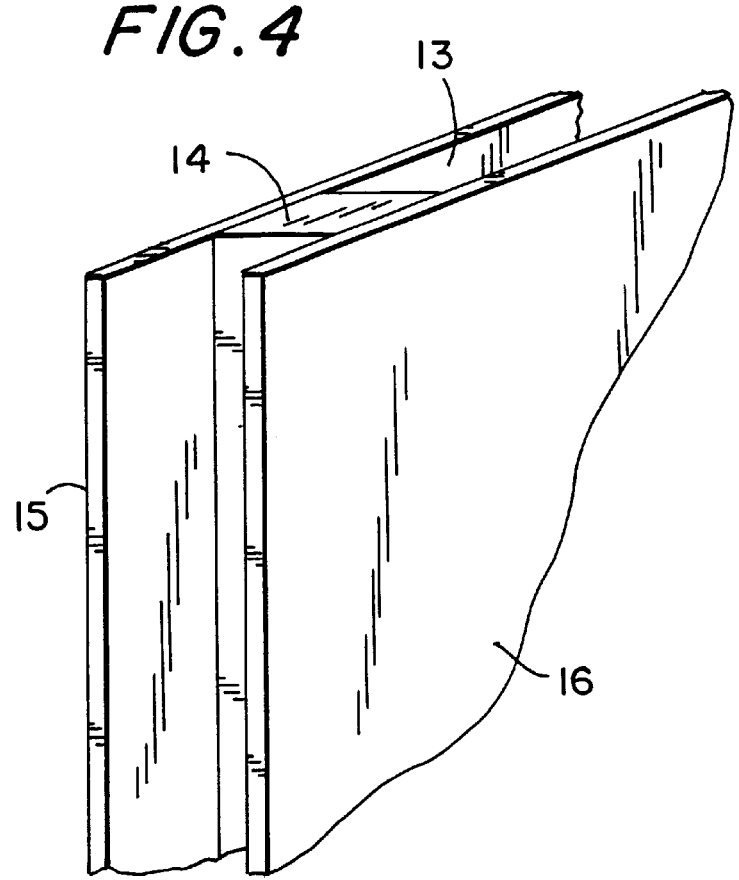
FIG. 4 is a perspective view of an outer wall panel or section showing a layer of recycled plastic waste materials and/or newly produced plastic materials for sound absorption and heat insulation for walls in wood structures, such as houses and other buildings.

According to FIG. 4, primary produced plastic materials or recycled material made of waste plastic materials are used for heat insulation and sound absorption in walls and wood structures. The intermediate spaces 13 are formed between an exterior wall sheeting 15 and an interior wall sheeting 16 attached to wall frame member 14. Not easily inflammable newly produced plastic materials or recycled materials made of waste plastic are filled into these intermediate spaces 13 for sound absorption and heat insulation.

Figure 5:
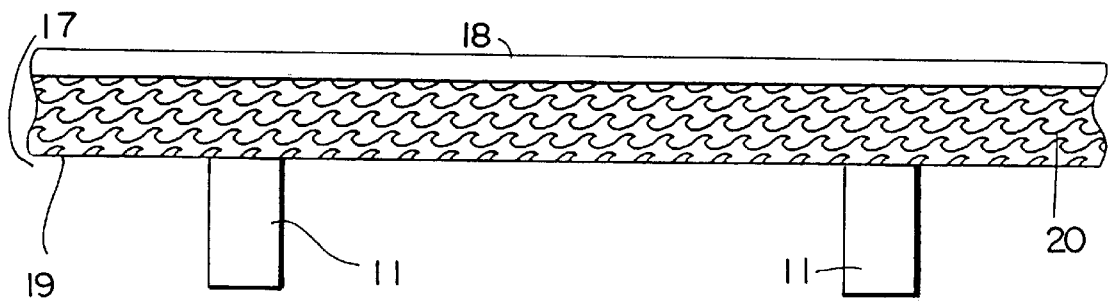
FIG. 5 is a cross-sectional view through a sandwich panel made of newly produced plastic materials or recycled plastic waste materials for the upper sub-flooring of a floor in a building.

A sandwich panel 17 for a load-bearing floor is shown in FIG. 5. This sandwich panel 17 consists of a base panel 18 and a connected force- and form-locking reinforcing member 19 that includes reinforcing elements 20, for example fibers, which rests on the floor beams 11. The compact base panel 18 consists of, for example, plastic materials or recycled materials made of waste plastic, which are made into a panel in a well-known way. It is, though, also possible to use other materials as the base panel 18. The reinforcing layer 19 consists of plastic materials or recycled materials made of waste plastic or even a mixture of newly produced plastic materials with recycled materials made of waste plastic, in which fibers are deposited as reinforcing elements 20. The reinforcing layer 19 is, for example, produced by pressing, and at the same time is connected with the base panel 18 in a form-and force-locking manner.

Figure 6:
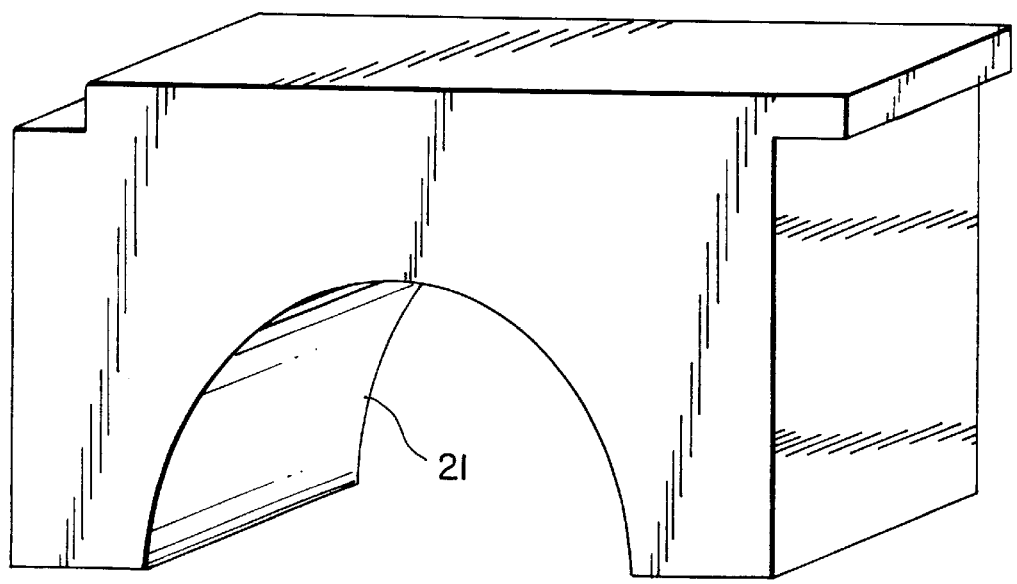
FIG. 6 is a perspective view of a bridge component made of newly produced plastic materials or recycled plastic waste materials.

In FIG. 6, a bridge component 21 made from newly produced plastic materials and/or recycled materials made of waste plastic is shown. The production of such building elements is done by normal technology. The production of compact conglomerates can be obtained by particles of the newly produced plastic materials and/or recycled materials made of waste plastic. By doing so, the necessary carrying capacity is obtained depending on the size of the building component. In addition, these bridge-like elements 21 can have reinforcing elements.

It is also possible that, for example, even stones or even street surfaces or other, not mentioned building elements may comprise primary produced plastic materials or recycled waste plastic materials in accordance with other embodiments of the present invention.

While the invention has been illustrated and described as embodied in improved materials and building components for construction engineering and methods of making them, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A universal building material consisting of shredded recycled waste plastic materials having predetermined thermal insulation and sound absorption properties.

2. The universal building material as defined In claim 1, wherein said shredded recycled waste plastic materials are selected from the group consisting of waste polyethylene, waste polyvinyl chloride, waste polypropylene, waste polystyrene and waste acrylonitrile butadiene styrene.

3. The universal building material as defined in claim 1, consisting of a fire-resistant material.

4. A method of tailor making a building material for a specific application in construction engineering or the building industry, said method consisting of the steps of:
   a) determining required properties of the building material required for the specific application;
   b) shredding a plurality of different waste plastic materials having different chemical compositions to form different shredded recycled waste plastic materials having different properties;

c) selecting a number of the different shredded recycled waste plastic materials according the specific application based on said required properties; and d) mixing said different shredded recycled waste plastic materials selected in step c) in predetermined proportions to form said building material for the specific application with the required properties.

5. A building material for a specific application in construction engineering or the building industry, said building material being made by a method consisting of the steps of:

a) determining required properties of the building material required for the specific application;

b) shredding a plurality of different waste plastic materials having different chemical compositions to form different shredded recycled waste plastic materials having different properties;

c) selecting a number of the different shredded recycled waste plastic materials according to the specific application based on said required properties; and d) mixing said different shredded recycled waste plastic materials selected in step c) in predetermined proportions to form said building material for the specific application with the required properties.

* * * * *